United States Patent
Balfe et al.

(10) Patent No.: US 10,065,176 B2
(45) Date of Patent: Sep. 4, 2018

(54) SYSTEM AND METHOD FOR REDUCING CARBON DIOXIDE EMISSIONS FROM A FLUE GAS GENERATED VIA COMBUSTING A FOSSIL FUEL

(71) Applicant: GENERAL ELECTRIC TECHNOLOGY GMBH, Baden (CH)

(72) Inventors: Michael Charles Balfe, Mainz (DE); Hao Tan, Hofheim (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/160,215

(22) Filed: May 20, 2016

(65) Prior Publication Data
US 2017/0333874 A1    Nov. 23, 2017

(51) Int. Cl.
| | | |
|---|---|---|
| *B01D 53/96* | (2006.01) | |
| *B01D 53/62* | (2006.01) | |
| *B01D 53/83* | (2006.01) | |
| *B01J 20/04* | (2006.01) | |
| *B01J 20/34* | (2006.01) | |
| *C01F 11/06* | (2006.01) | |

(Continued)

(52) U.S. Cl.
CPC ......... *B01J 20/3483* (2013.01); *B01D 53/62* (2013.01); *B01D 53/83* (2013.01); *B01J 8/125* (2013.01); *B01J 20/041* (2013.01); *B01J 20/3433* (2013.01); *C01F 11/06* (2013.01); *B01D 53/08* (2013.01); *B01D 2251/404* (2013.01); *B01D 2251/602* (2013.01); *B01D 2253/1124* (2013.01); *B01D 2257/30* (2013.01); *B01D 2257/504* (2013.01); *B01D 2258/0283* (2013.01); *B01J 2208/00743* (2013.01); *H05K 999/99* (2013.01); *Y02C 10/04* (2013.01)

(58) Field of Classification Search
None
See application file for complete search history.

(56) References Cited

U.S. PATENT DOCUMENTS

| | | |
|---|---|---|
| 2,771,549 A | 11/1956 | Viterisi |
| 2014/0034134 A1 | 2/2014 | Fan et al. |
| 2015/0368157 A1 | 12/2015 | Balfe et al. |

FOREIGN PATENT DOCUMENTS

| | | |
|---|---|---|
| WO | 2012152899 A1 | 11/2012 |

OTHER PUBLICATIONS

Extended European Search Report and Opinion issued in connection with corresponding EP Application No. 17171185.6 dated Sep. 22, 2017.

*Primary Examiner* — Daniel Berns
(74) *Attorney, Agent, or Firm* — Cynthia W. Flanigan (57) ABSTRACT

A system for reducing carbon dioxide emissions from a flue gas generated via combusting a fossil fuel is provided. The system includes a calcination chamber and a sealing-purger. The calcination chamber is configured to receive a plurality of loaded sorbent particles and a plurality of heat-transferring particles such that the loaded sorbent particles are heated within the calcination chamber so as to release carbon dioxide. The sealing-purger includes at least one gravity driven moving particle bed. The at least one gravity driven moving particle bed allows the plurality of heat-transferring particles or the plurality of sorbent particles to enter or leave the calcination chamber while restricting the flue gas from entering the calcination chamber and the released carbon dioxide particles from leaving the calcination chamber.

7 Claims, 4 Drawing Sheets

(51) Int. Cl.
*B01J 8/12* (2006.01)
*B01D 53/08* (2006.01)

SYSTEM AND METHOD FOR REDUCING CARBON DIOXIDE EMISSIONS FROM A FLUE GAS GENERATED VIA COMBUSTING A FOSSIL FUEL

BACKGROUND

Technical Field

Embodiments of the invention relate generally to power plant technology and, more specifically, to a system and method for reducing carbon dioxide emissions from a flue gas generated via combusting a fossil fuel.

Discussion of Art

Many electrical power plants combust fossil fuels in order to generate heat, which in turn is used to power an electrical generator via a steam turbine. The combustion of fossil fuels, however, generates large amounts of carbon dioxide ("$CO_2$"). Accordingly, due to the increased concern that $CO_2$ may be contributing to global warming, many fossil fuel based power plants now attempt to reduce $CO_2$ emissions by recapturing and storing $CO_2$ via "carbon capture" technologies.

One such technology is a Regenerative Calcium Cycle ("RCC"), which is a post-combustion system that utilizes two reactors, e.g., a carbonator and a calciner. In the carbonator, $CO_2$ from the flue gas reacts with lime, or other carbon absorbing compounds, to form limestone. The limestone is then sent to the calciner where it is heated and converted back into lime and $CO_2$ via an endothermic calcination reaction. The $CO_2$ is then captured and stored and the lime is returned back to the carbonator.

Presently, fossil fuel based plants which implement RCC systems utilize in-situ oxy-fired coal combustion to supply the heat required for the endothermic calcination reaction. This approach, however, suffers from the introduction of acidic components to the sorbent material, such as sulfur and chlorine based compounds found in coal, which reduce the ability of the CaO containing sorbent to absorb $CO_2$. Additionally, fossil fuel based power plants that utilize conventional RCC technology require near pure oxygen to drive the calcination reaction. Both air ingress and impurities in the near pure oxygen lead to a necessary polishing of the generated $CO_2$ with a dedicated gas processing unit to remove incondensable gases to meet pipe-line specifications.

In view of the above, what is needed is an improved system and method for reducing carbon dioxide emissions from a flue gas generated via combusting a fossil fuel.

BRIEF DESCRIPTION

In an embodiment, a system for reducing carbon dioxide emissions from a flue gas generated via combusting a fossil fuel is provided. The system includes a calcination chamber and a sealing-purger. The calcination chamber is configured to receive a plurality of loaded sorbent particles and a plurality of heat-transferring particles such that the loaded sorbent particles are heated within the calcination chamber so as to release carbon dioxide. The sealing-purger includes at least one gravity driven moving particle bed. The at least one gravity driven moving particle bed allows the plurality of heat-transferring particles or the plurality of sorbent particles to enter or leave the calcination chamber while restricting the flue gas from entering the calcination chamber and the released carbon dioxide particles from leaving the calcination chamber.

In another embodiment, a method for reducing carbon dioxide emissions from a flue gas generated via combusting a fossil fuel is provided. The method includes restricting the flue gas from entering a calcination chamber via a sealing-purger that includes at least one gravity driven moving particle bed. The calcination chamber is configured to receive a plurality of loaded sorbent particles and a plurality of heat-transferring particles such that the loaded sorbent particles are heated within the calcination chamber so as to release carbon dioxide. The method further includes restricting the carbon dioxide from leaving the calcination chamber via the at least one gravity driven moving particle bed.

In yet another embodiment, a sealing-purger for restricting a bulk flow of a first gas from entering a chamber and for further restricting a bulk flow of a second gas from exiting the chamber is provided. The sealing-purger includes at least one gravity driven moving particle bed formed from a continuous bulk flow of solid particles; and a flow restriction device that adjusts a height of the at least one gravity driven moving particle bed. The sealing-purger allows the solid particles to enter and exit the chamber.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. Accordingly, the terms "upstream" and "downstream," as used herein, describe the position of the referenced elements with respect to a flow path of a fluid flowing between and/or near the referenced elements. Additionally, as used herein, the term "fill" includes both fully and partially filling a containing object with a filling object. As also used herein, the term "heating contact" means that the referenced objects are in proximity of one another such that heat/thermal energy can transfer between them.

Further, while the embodiments disclosed herein are described with respect to fossil fuel based power plants, e.g., coal and oil based power plants, that utilize carbonators and calcination reactions, it is to be understood that embodiments of the present invention are equally applicable to any device and/or process in which a compound and/or element must be captured from a containing substance via a sorbent and coupled desorption reaction.

Figure 1:
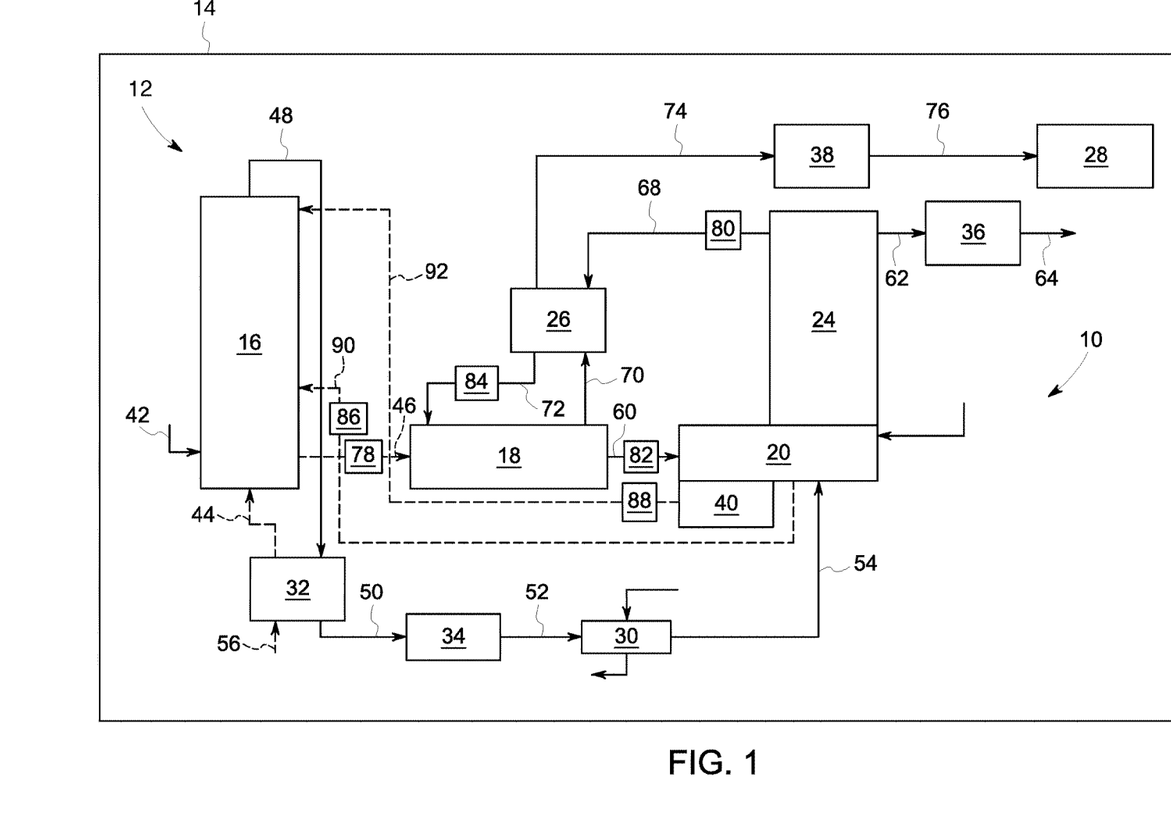
FIG. 1 is a diagram of an exemplary system for reducing carbon emissions from a flue gas generated via combusting a fossil fuel in accordance with an embodiment of the invention.

Accordingly, referring to FIG. 1, a system 10 that utilizes an integrated RCC 12 for reducing carbon dioxide emissions from a flue gas generated via combusting a fossil fuel is shown. As will be appreciated, the system 10 utilizing the RCC 12 may be fully integrated into a power plant 14. Accordingly, in embodiments, the power plant 14 includes a particle heating furnace 16, a calciner/calcination chamber 18, a classifier 20, a carbonator 24, a sorbent preheater 26, CO2 compression equipment 28, a desulfurizer 30, an air preheater 32, and one or more heat recovery components 34, 36, 38, 40. As is to be understood, the above elements of the system 10 may include auxiliary equipment associated with their respective primary functions. For example, the carbonator 24 may include one or more cyclones, loop seals and internal heat transfer equipment. It is further to be understood that additional equipment of the power plant 14, typically associated with a coupled steam cycle and power generation, has not been explicitly shown in the drawings for the purpose of improving clarity. Further still, while the drawings and specification herein discuss and show heat being transferred to the coupled steam cycle, e.g., heat recovery components 34, 36, 38, 40, it is to be further understood that heat transfer to the steam cycle may also occur in other components and/or process steps not explicitly labeled "heat recovery".

As shown in FIG. 1, the particle heating furnace 16 produces a flue gas via combusting coal (or other fossil fuels) with air received via conduits 42 and 44, respectively. As will be appreciated, the particle heating furnace 16 increases the temperature of heat-transferring particles (not shown and also referred to hereinafter as "HT particles") which are sent to the calciner 18 via conduit 46 to drive a high temperature endothermic calcination reaction. As will be appreciated, in embodiments, the HT particles may be inert compounds/elements. Further, partially cooled flue gas exits the particle heating furnace 16 via conduits 48 and 50 and may be cooled by heat recovery component 34 before entering the desulfizer 30 via conduit 52. After having a bulk amount of sulfur removed via the desulfurizer 30, the flue gas, which may then be suitable for contact with a plurality of carbon absorbing particles (hereinafter also referred to as "sorbent"), flows to the classifier 20 and the carbonator 24 via conduit 54.

In embodiments, the air preheater 32 may receive the air, via conduit 56, and then heat the air prior to combustion in the particle heating furnace 16. In embodiments, the air preheater 32 may heat the air via cooling the flue gas received from the particle heating furnace 16 via conduit 48.

The classifier 20 may be fluidly connected to and upstream of the carbonator 24 and receives flue gas via conduit 54. The classifier 20 may also be fluidly connected to and down stream of the calciner 18 via conduit 60 through which a mixture of lean sorbent and HT particles flow from the calciner 18 to the classifier 20. The term "lean", as used herein with respect to the sorbent, describes the state of the sorbent when stripped of CO2 absorbed from the flue gas. As will be appreciated, in embodiments, the classifier 20 utilizes the flow of flue gas to separate lean sorbent from the HT particles due to differences in diameter and density between the molecules of the sorbent the HT particles.

The carbonator 24 may be fluidly connected to and downstream of the classifier 20. The carbonator 24 receives flue gas and entrained sorbent from the classifier 20. It is within the carbonator 24 that the lean sorbent absorbs CO2 from the flue gas, i.e., the lean sorbent becomes loaded sorbent and the flue gas becomes CO2 poor. The term "loaded", as used herein with respect to the sorbent, describes the state of the sorbent when containing CO2 absorbed from the flue gas. The flue gas then exits the carbonator 24 via conduit 62 where it is further processed (heat is removed/recovered) by heat recovery component 36 prior to being emitted to the atmosphere via conduit 64. The loaded sorbent, is separated from the CO2 poor flue gas in a cyclone (not shown) and flows to the sorbent preheater 26 via conduit 68.

The sorbent preheater 26 is used to preheat loaded sorbent with hot CO2 from the calciner 18 via conduit 70 before the loaded sorbent is fed via conduit 72 to the calcination chamber 18.

The calciner/calcination chamber 18 may also be fluidly connected with the particle heating furnace 16 and fed with heated HT particles via conduit 46. The calciner 18 may be configured to receive the HT particles and the loaded sorbent so as to form a mixture including both the HT particles and the sorbent, i.e., the loaded sorbent is brought into heating contact with the HT particles. Mixing the HT particles with the loaded sorbent within the calciner 18 triggers the release of the absorbed CO2 via an endothermic calcination reaction. Specifically, during the endothermic calcination reaction, heat is transferred from the HT particles to the loaded sorbent which causes the loaded sorbent to unload/release the absorbed CO2, thus, transitioning the loaded sorbent back into lean sorbent. The released CO2 is then transferred via conduit 70 to the sorbent preheater 26 where it is cooled, via heating of the loaded sorbent, further cooled via conduit 74 and heat recovery component 38, and further processed by the CO2 compression equipment 28 via conduit 76 in preparation for transport and storage.

As stated above, the mixing of heat-transferring particles and sorbent within the calciner/calcination chamber 18 releases CO2. As will be appreciated, the flue gas, which may flow to and/or through multiple components of the power plant 14 contains impurities, e.g., nitrogen gas ("N2"), oxygen gas ("O2"), and/or water ("H2O"), which, if allowed to enter the calcination chamber 18 in small quantities, would reduce the purity/quality of the captured CO2 product and reduce the efficiency of the RCC 12 and/or the power plant 14. As such, the calcination chamber 18 may be configured to have an operating pressure higher than adjacent equipment that is in fluid contact, e.g., the particle heating furnace 16 and/or the classifier 20, to reduce and/or prevent the ingress of contaminating flue gas components into the calcination chamber 18. As will be appreciated, however, operating the calcination chamber 18 at an increased pressure, compared to the adjacent equipment in fluid contact, requires special considerations to avoid a loss of CO2 product (which would otherwise flow toward the adjacent equipment operating at a lower pressures), while still allowing the feeding of solid particles into the calcination chamber 18 against a pressure gradient resulting from the increased operating pressure.

Accordingly, as further shown in FIG. 1. The system 10 may further include one or more sealing-purgers 78, 80, 82, 84, 86, and 88 that restrict the flow of CO2 and the flue gas between the various components of the system 10. For example, in embodiments, sealing-purgers 78, 80 and 82 may isolate the calcination chamber 18 from the adjacent equipment operating at lower pressure, i.e., restrict the bulk movement of flue gas from entering the calcination chamber 18 and the bulk movement of CO2 from leaving the calcination chamber 18, while simultaneously allowing the bulk movement of solids (HT particles and loaded sorbent) through the calcination chamber 18 via conduits 46, 72, and 60. Further, in embodiments, sealing-purger 84 may restrict reverse flow of CO2 through the sorbent preheater 26. Additionally, the system 10 may incorporate sealing-purgers 86 and 88 at locations not directly associated with the calcination chamber 18 or CO2 product quality. For example, as shown in FIG. 1, sealing-purger 86 may restrict a bulk flow of hot flue gas into solids transport equipment, thus, relaxing design criteria and allowing for the use of less expensive materials for such equipment. Further, sealing-purger 88 may restrict a bulk flow of flue gas from the classifier 20 and the internal recirculation of flue gas to the outlet of the particle heating furnace 16.

Figure 2:
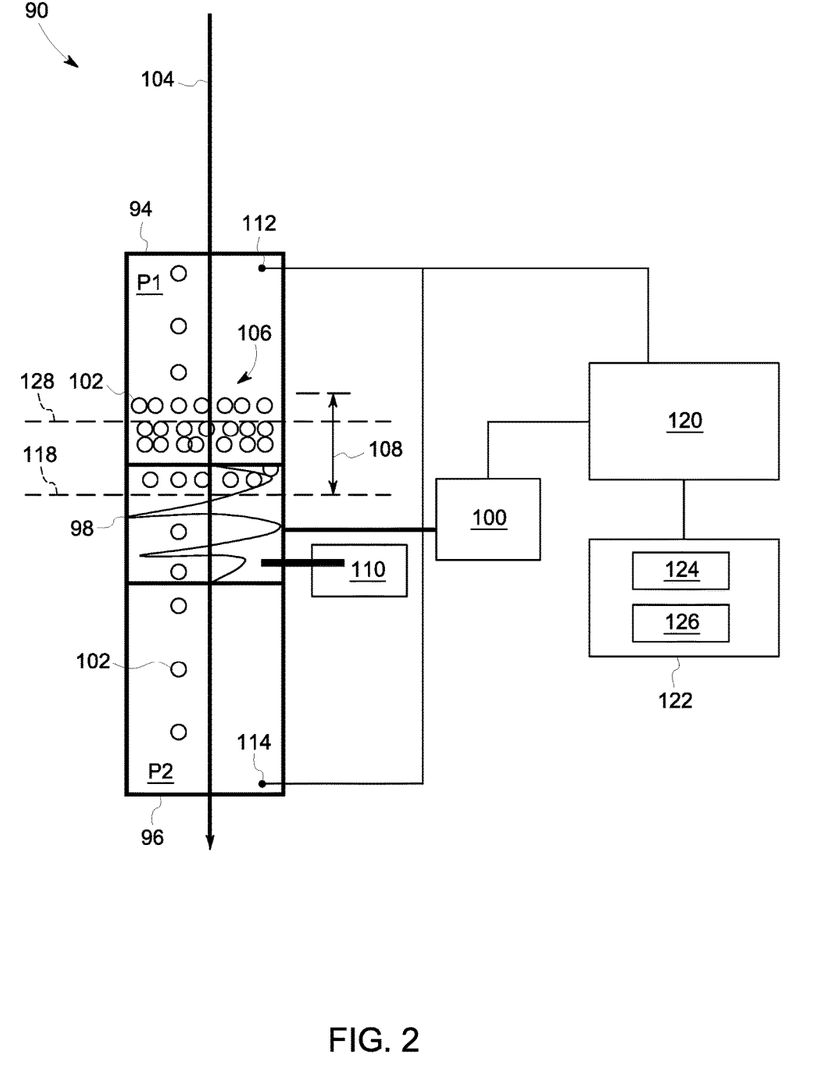
FIG. 2 is a diagram of a sealing-purger of the system of FIG. 1 in accordance with an embodiment of the invention.
Figure 3:
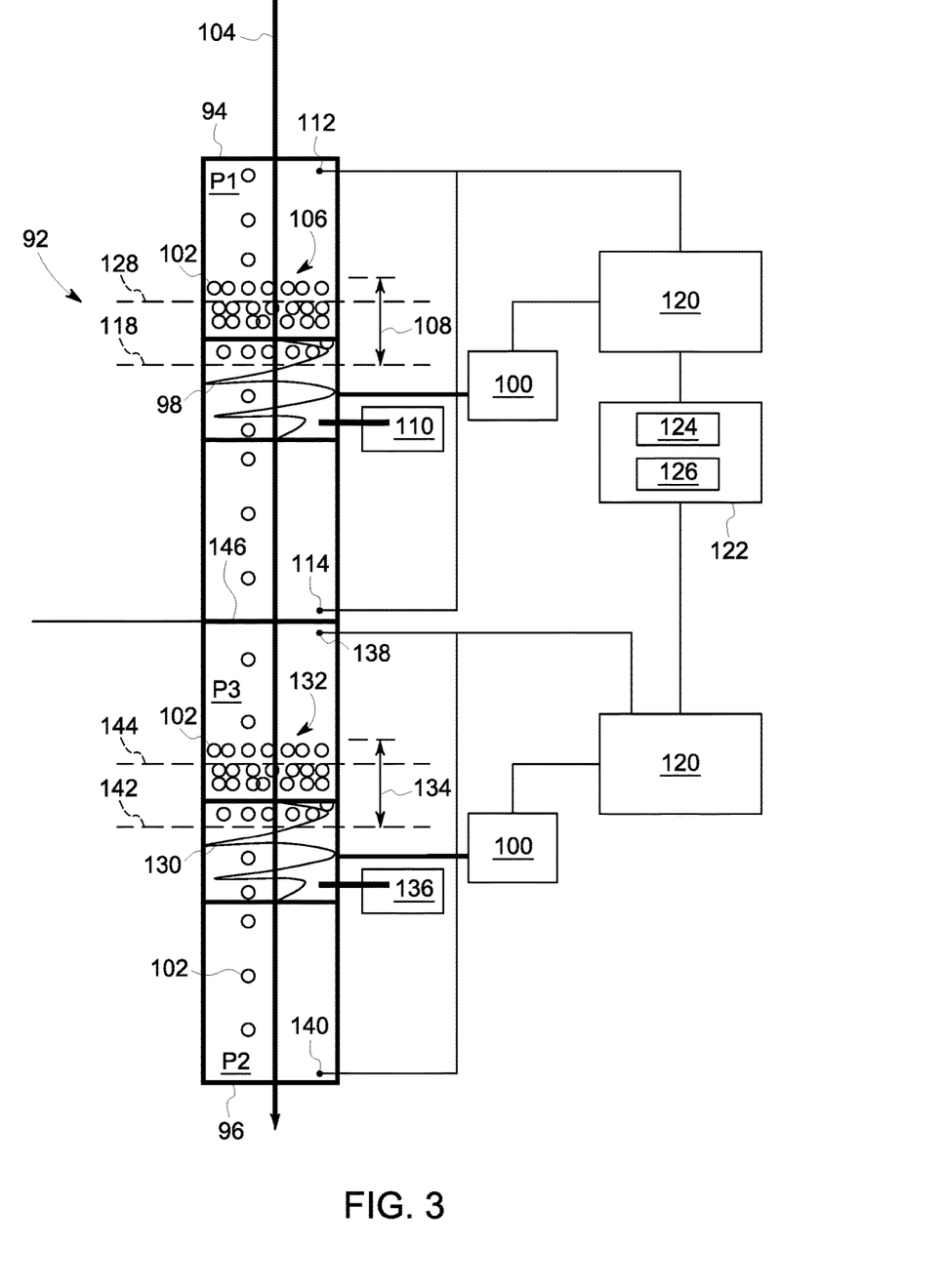
FIG. 3 is diagram of another embodiment of the sealing-purger of FIG. 2 in accordance with an embodiment of the invention.

Turning now to FIGS. 2 and 3, two sealing-purgers 90 and 92 in accordance with embodiments are shown. In particular, sealing-purger 90 is configured to operate in locations where an upstream pressure P1 is lower than a down stream pressure P2, e.g., sealing-purgers 78 and 84, while sealing-purger 92 is configured to operate in locations where the upstream pressure is higher than the down stream pressure, e.g., sealing-purger 82. As shown in FIG. 2, sealing-purger 90 has an inlet 94 fluidly connected to an outlet 96. A flow restricting device 98 is disposed within the sealing-purger 90 between the inlet 94 and the outlet 96 and may be actuated/driven by a motor 100. As will be appreciated, the inlet 94 and the outlet 96 are configured to fluidly connect the sealing-purger 90 to two separate devices/pressure systems, wherein the upstream pressure P1 of the device fluidly connected to the inlet 94 is lower than the downstream pressure P2 of the device fluidly connected to the outlet 96. Thus, a pressure gradient exists across the sealing-purger 90.

As will be appreciated, in operation according to an embodiment, solid particles (depicted as hollow circles 102, e.g., HT-particles and/or sorbent), flow into the inlet 94 along with flue gas. The solid particles 102 are driven by the force of gravity to move against the pressure gradient (from P1 to P2) along a flow direction 104. As the solid particles 102 move through the sealing-purger 90, they meet the flow restricting device 98 which slows and/or stops the bulk free flow of solid particles 102 so that a moving particle bed 106 is formed. In embodiments, the flow restriction device 98 may be a helical spiral which opens toward, and is restricted in the direction of, the direction of particle flow 104. In other embodiments, the flow restriction device 98 may be a series or grid of plates or bars that restrict the flow of the solid particle 102. As will be appreciated, without movement of the restriction flow device 98 via motor 100, the flow of solid particles 102 through the sealing-purger 90 is hindered and/or prevented. As such, movement of the flow restriction device 98 via the motor 100 facilitates the gravity driven movement/flow of the solid particles 102, e.g., heat-transferring and/or sorbent particles, through the sealing-purger 90 in the direction 104.

As such, the dimensioning and design of the moving particle bed 106 may be such that the free flow of particles 102 from the upstream side P1 to the downstream side P2 occurs spontaneously in the absence of the flow restricting device 98. Thus, the bulk flow of gas through the moving particle bed 106 may be restricted by ensuring that the pressure drop over the moving particle bed 106 compensates the pressure difference between the higher pressure system P2 and the lower pressure P1 system. In other words, the high downstream pressure gas P2, e.g., CO2, restricts low pressure upstream gas, e.g., flue gas, from passing through the outlet 96, while the moving particle bed 106 restricts the high downstream pressure gas P2 from passing through the inlet 94.

As will be appreciated, in embodiments, the pressure drop accumulated over the moving particle bed 106 is controllable/adjustable by changing/adjusting the flow restricting device 98, which in turn modifies/adjusts the flow rate of the solid particles 102 through the moving particle bed 106, i.e., the linear velocity of the moving particle bed 106. Adjusting the linear velocity of the moving particle bed 106 in turn adjusts a height 108 of the moving particle bed 106. For example, in embodiments, the faster or slower the flow restricting device 98 moves the solid particles 102 through the moving particle bed 106, the shorter or taller, respectively, the height 108 becomes. Adjusting the linear velocity of the moving particle bed 106 may also purge flue gas occupying the voids between the solid particles 102, hereafter referred to also as "inter particle spaces". Thus, in embodiments, the flow resistance device 98 modifies the gravity driven flow of solid particles 102 against a pressure gradient (from lower P1 to higher P2 pressure).

Additionally, and as further shown in FIG. 2, the sealing-purger 90 may further include one or more sensors 110, 112, 114 that may be utilized to determine a location of a pressure front 118 that may exist within the sealing-purger 90 between the low upstream pressure P1 and the high downstream pressure P2. For example, sensor 110 may be disposed within the moving particle bed 106 such that sensor 110 directly measures the front 118. Additionally, sensors 112 and 114 may each be disposed such that they directly measure P1 and P2, respectively, which may in turn be used to indirectly calculate the front 118. As will be appreciated, sensors 110, 112, and 114 may be in electronic communication with a pressure control device ("PDC") 120 which may also be in electronic communication with, or form part of, a controller 122 that includes at least one processor 124 and a memory device 126 used to store process information and/or a purging application. In embodiments, the PDC 120 may be in further electronic communication with the motor 100 such that the PDC 120 adjusts the height 108 of the moving particle bed 106 based at least in part on a desired front location 128. For example, in embodiments, the pressure gradient across the sealing-purger 90 may be less than or equal to 300 mbars. As such, in embodiments, the desired front location 128 and/or the height 108 of the moving particle bed 106 may be selected by design and control to ensure adequate compensation of pressure drop between the gravity driven flow 104 of the solid particles 102 and the pressure gradient in the gas occupying the inter particle void.

Referring now to FIG. 3, as stated above, sealing-purger 92 is configured to operate in locations where the upstream pressure P1 is higher than the down stream pressure P2, e.g., sealing-purger 92. As shown in FIG. 3, sealing-purger 92 is similar to sealing-purger 90 in that sealing purger 92 includes an inlet 94 fluidly connected to an outlet 96 with a flow restriction device 98 disposed within the sealing-purger 92 between the inlet 94 and the outlet 96 that forms a moving particle bed 106. However, unlike sealing-purger 90, the inlet 94 and the outlet 96 of sealing-purger 92 are configured to be fluidly connected to a high upstream pressure P1 device and a low downstream pressure device P2, respectively. Accordingly, sealing-purger 92 may further includes an additional/second flow-restricting device 130 that forms an additional moving particle bed 132 downstream of the first moving particle bed 106. As further shown in FIG. 3, a height 134 of the second moving particle bed 130 may be adjusted via a PDC 120, motor 100, and one or more sensors 136, 138, 140 so as to move a front 142 to a desired front location 144 in manner similar to the one described above in relation to sealing-purger 90. Further, sealing-purger 92 may further include a purge-gas inlet 146 located at an intermediate location between the first moving particle bed 106 and the second moving particle bed 132.

As will be understood, in operation according to an embodiment, solid particles 102 enter the inlet 94 under the force of gravity and encounter the first flow restricting device 98 and form the first moving particle bed 106. As the solid particles 102 move past the first flow restricting device 98, they encounter the second flow restricting device 130 and form the second moving particle bed 132. In embodiments, a purge gas may be introduced via the purge gas inlet 146 such that a midstream pressure P3 of the space between the first 106 and the second 132 moving particle beds is increased. In embodiments, the purge gas 146 may be pressurized air and/or available inert gases such as steam or nitrogen or flue gas having a pressure greater than atmospheric pressure and less than 2 bara.

As will be appreciated, increasing P3 via the purge gas 146 creates an operating environment for the first moving particle bed 106 in sealing-purger 92 which is analogous to the operation described above for moving particle bed 106 in sealing-purger 90. In other words, purge gas 146 is introduced so as to locally reverse the pressure gradient P3-P1 over the first moving particle bed 106 and flow restriction device 98. Further, in embodiments, the introduction of purge gas 146 may also purge CO2 from the inter particle spaces of the first moving particle bed 106, and the velocity and flow rate of the purge gas 146 may be based at least in part on the design and capacity of the plant 14. Additionally, in embodiments, the design of sealing-purger 92 is such that the pressure drop as measured in the inter particle void from the point of purge gas 146 introduction to the downstream system P2 is less than the pressure drop between the point of purge gas 146 introduction and the upstream system P1. As a result, the introduced purge gas 146 flows downstream towards the outlet 96.

Thus, in embodiments, sealing-purger 82 (FIG. 1) may prevent a bulk flow of CO2 from leaving the higher pressure calcination chamber 18 and entering the lower pressure particle classifier 20. Accordingly, purge gas 146 may be added at a location within sealing-purger 82 between the two moving particle beds 106 and 132 to locally increase the operating pressure P3 and purge inter-particle space, thereby restricting the loss of CO2 from the calcination chamber 18 and allowing the additional purge gas 146 to flow (in place of the CO2) toward the classifier 20.

Figure 4:
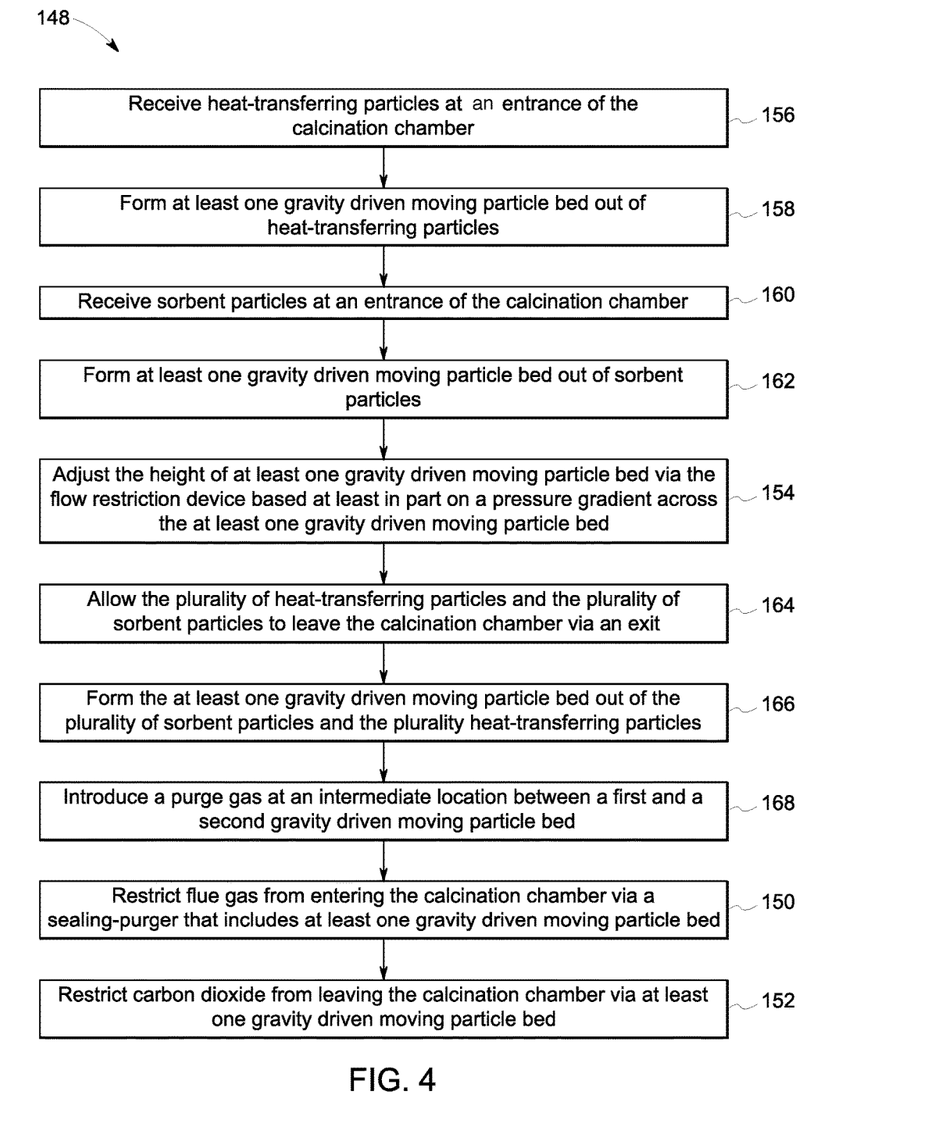
FIG. 4 is flow chart showing a method for reducing carbon emissions from a flue gas generated via combusting a fossil fuel utilizing the system of FIG. 1 in accordance with an embodiment of the invention.

Turning now to FIG. 4, an embodiment of a method 148 for reducing carbon dioxide emissions from a flue gas generated via combusting a fossil fuel via the system 10 is shown. As will be appreciated, in embodiments, the purging application stored in memory device 126 may be loaded into the at least one processor/CPU 124 such that the controller 122 may perform all, or part, of method 148. Accordingly, as shown in FIG. 4, the method 148 includes restricting 150 flue gas from entering a calcination chamber 18 via a sealing-purger 78, 80, 82 that includes at least one gravity driven moving particle bed 106, and restricting 152 the carbon dioxide from leaving the calcination chamber 18 via the at least one gravity driven moving particle bed 106. In embodiments, the method 148 may further include adjusting 154 the height of the at least one gravity driven moving particle 106 bed via the flow restriction device 98 based at least in part on a pressure gradient across the at least one gravity driven moving particle bed 106. In embodiments, the method 148 may further include receiving 156 HT particles at an entrance/inlet of the calcination chamber 18; and forming 158 the at least one gravity driven moving particle bed 106 out of the plurality of HT particles. In such embodiments, the sealing-purger 78/90 may be disposed upstream of the calcination chamber 18 entrance so as to fluidly connect the calcination chamber 18 to a device that has a lower pressure than the calcination chamber 18. In embodiments, the method 148 may further include receiving 160 sorbent particles at an entrance/inlet of the calcination chamber 18, and forming 162 the at least one gravity driven moving particle bed 106 out of the sorbent particles. In such embodiments, the sealing-purger 80/90 may be disposed upstream of the calcination chamber 18 entrance so as to fluidly connect the calcination chamber 18 to a device that has a lower pressure than the calcination chamber 18. In embodiments, the method 148 may further include allowing 164 the heat-transferring particles and the sorbent particles to leave the calcination chamber 18 via an exit (conduit 60 in FIG. 1), and forming 166 the at least one gravity driven moving particle bed 106 out of the sorbent and HT particles. In such embodiments, the sealing-purger 82/92 may be disposed downstream of the calcination chamber 18 exit so as to fluidly connect the calcination chamber 18 to a device that has a lower pressure than the calcination chamber 18. In embodiments, the method 148 may further include introducing 168 a purge gas 146 at an intermediate location between a first 106 and a second 132 gravity driven moving particle bed.

It is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the system 10 may include at least one processor and system memory which may include random access memory (RAM) and read-only memory (ROM). The system 10 may further include an input/output controller, and one or more data storage structures. All of these latter elements may be in communication with the at least one processor to facilitate the operation of the system 10 as discussed above. Suitable computer program code may be provided for executing numerous functions, including those discussed above in connection with the system 10 and methods disclosed herein. The computer program code may also include program elements such as an operating system, a database management system and "device drivers" that allow the system 10, to interface with computer peripheral devices, e.g., sensors, a video display, a keyboard, a computer mouse, etc.

The at least one processor of the system 10 may include one or more conventional microprocessors and one or more supplementary co-processors such as math co-processors or the like. Elements in communication with each other need not be continually signaling or transmitting to each other. On the contrary, such elements may transmit to each other as necessary, may refrain from exchanging data at certain times, and may cause several steps to be performed to establish a communication link there-between.

The data storage structures such as memory discussed herein may include an appropriate combination of magnetic, optical and/or semiconductor memory, and may include, for example, RAM, ROM, flash drive, an optical disc such as a compact disc and/or a hard disk or drive. The data storage structures may store, for example, information required by the system 10 and/or one or more programs, e.g., computer program code such as the purging application and/or other computer program product, adapted to direct the system 10. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, includes one or more physical or logical blocks of computer instructions, which may, for instance, be organized as an object, procedure, process or function. Nevertheless, the executables of an identified program need not be physically located together, but may include separate instructions stored in different locations which, when joined logically together, form the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor 124 of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device, e.g., a server, can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, embodiments of the present invention provide for a system for reducing carbon dioxide emissions from a flue gas generated via combusting a fossil fuel. The system includes a calcination chamber and a sealing-purger. The calcination chamber is configured to receive a plurality of loaded sorbent particles and a plurality of heat-transferring particles such that the loaded sorbent particles are heated within the calcination chamber so as to release carbon dioxide. The sealing-purger includes at least one gravity driven moving particle bed. The at least one gravity driven moving particle bed allows the plurality of heat-transferring particles or the plurality of sorbent particles to enter or leave the calcination chamber while restricting the flue gas from entering the calcination chamber and the released carbon dioxide particles from leaving the calcination chamber. In certain embodiments, a height of the at least one gravity driven moving particle bed is adjusted by a flow restriction device based at least in part on a pressure gradient across the at least one gravity driven moving particle bed. In certain embodiments, the calcination chamber includes an entrance configured to receive the plurality of heat-transferring particles, the sealing-purger is disposed upstream of the entrance and fluidly connects the calcination chamber to a device that has a lower pressure than the calcination chamber, and the at least one gravity driven moving particle bed is formed by the plurality of heat-transferring particles. In certain embodiments, the calcination chamber includes an entrance configured to receive the plurality of sorbent particles, the sealing-purger is disposed upstream of the entrance and fluidly connects the calcination chamber to a device that has a lower pressure than the calcination chamber, and the at least one gravity driven moving particle bed is formed by the plurality of sorbent particles. In certain embodiments, the calcination chamber includes an exit configured to allow the plurality of heat-transferring particles and the plurality of sorbent particles to leave the calcination chamber, the sealing-purger is disposed downstream of the exit and fluidly connects the calcination chamber to a device that has a lower pressure than the calcination chamber, and the at least one gravity driven moving particle bed is formed by the plurality of sorbent particles and the plurality heat-transferring particles. In certain embodiments, a first gravity driven moving particle bed of the sealing-purger is disposed upstream of a second gravity driven moving particle bed of the sealing-purger. In certain embodiments, a purge gas is introduced at an intermediate location between the first and the second gravity driven moving particle beds. In certain embodiments, the purge gas is pressurized air.

Other embodiments provide for a method for reducing carbon dioxide emissions from a flue gas generated via combusting a fossil fuel. The method includes restricting the flue gas from entering a calcination chamber via a sealing-purger that includes at least one gravity driven moving particle bed. The calcination chamber is configured to receive a plurality of loaded sorbent particles and a plurality of heat-transferring particles such that the loaded sorbent particles are heated within the calcination chamber so as to release carbon dioxide. The method further includes restricting the carbon dioxide from leaving the calcination chamber via the at least one gravity driven moving particle bed. In certain embodiments, the method further includes adjusting a height of the at least one gravity driven moving particle bed via a flow restriction device based at least in part on a pressure gradient across the at least one gravity driven moving particle bed. In certain embodiments, the method further includes receiving the plurality of heat-transferring particles at an entrance of the calcination chamber, and the sealing-purger is disposed upstream of the entrance so as to fluidly connect the calcination chamber to a device that has a lower pressure than the calcination chamber. In such embodiments, the method further includes forming the at least one gravity driven moving particle bed out of the plurality of heat-transferring particles. In certain embodiments, the method further includes receiving the plurality of sorbent particles at an entrance of the calcination chamber, and the sealing-purger is disposed upstream of the entrance so as to fluidly connect the calcination chamber to a device that has a lower pressure than the calcination chamber. In such embodiments, the method further includes forming the at least one gravity driven moving particle bed out of the plurality of sorbent particles. In certain embodiments, the method further includes allowing the plurality of heat-transferring particles and the plurality of sorbent particles to leave the calcination chamber via an exit, and the sealing-purger is disposed downstream of the exit so as to fluidly connect the calcination chamber to a device that has a lower pressure than the calcination chamber. In such embodiments, the method further includes forming the at least one gravity driven moving particle bed out of the plurality of sorbent particles and the plurality heat-transferring particles. In certain embodiments, a first gravity driven moving particle bed of the sealing-purger is disposed upstream of a second gravity driven moving particle bed of the sealing-purger. In certain embodiments, the method further includes introducing a purge gas at an intermediate location between the first and the second gravity driven moving particle beds. In certain embodiments, the purge gas is pressurized air.

Yet still other embodiments provide for a sealing-purger for restricting a bulk flow of a first gas from entering a chamber and for further restricting a bulk flow of a second gas from exiting the chamber. The sealing-purger includes at least one gravity driven moving particle bed formed from a continuous bulk flow of solid particles; and a flow restriction device that adjusts a height of the at least one gravity driven moving particle bed. The sealing-purger allows the solid particles to enter and exit the chamber. In certain embodiments, the chamber includes an entrance configured to receive the continuous bulk flow of solid particles. In such embodiments, the sealing-purger is disposed upstream of the entrance and fluidly connects the chamber to a device that has a lower pressure than the chamber. In certain embodiments, the chamber includes an exit configured to allow the solid particles to leave the chamber. In such embodiments, the sealing-purger is disposed downstream of the exit and fluidly connects the chamber to a device that has a lower pressure than the calcination chamber. In certain embodiments, a first gravity driven moving particle bed of the sealing-purger is disposed upstream of a second gravity driven moving particle bed of the sealing-purger, and a purge gas is introduced at an intermediate location between the first and the second gravity driven moving particle beds.

Accordingly, as will be appreciated, the sealing-purgers 90 and 92 differ from traditional solids transport screws as the flow of solids, e.g., the heat-transferring and/or sorbent particles, is driven by gravity and the flow rate is irrespective of the devises displacement volume. Thus, by utilizing sealing-purgers having gravity driven particle beds with adjustable heights, some embodiments of the present invention ensure that $CO_2$ product purity is maintained during the transport of large quantities of heat-transferring particles through the calciner/calcination chamber while minimizing the amount of $CO_2$ lost. Further, some embodiments, in which the purger is disposed at a furnace and/or carbonator loop seal (not shown) reduce and/or eliminate the risk that moisture, $N_2$, and/or other contaminates will contaminate the $CO_2$ product within the calcination chamber 18. Thus, such embodiments may eliminate the need for $CO_2$ polishing. Additionally, by restricting the $CO_2$ from leaving the calcination/reaction chamber via sealing-purgers in accordance with the embodiments disclosed herein, some embodiments may increase the $CO_2$ capture rate of a power plant by as much as 4% over a similar power plant that does not implement embodiments of the present invention.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted based on 35 U.S.C. § 112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method, the method comprising:
  restricting a flue gas from entering a calcination chamber via a sealing-purger that includes at least one gravity driven moving particle bed, the calcination chamber configured to receive a plurality of loaded sorbent particles and a plurality of heat-transferring particles such that the loaded sorbent particles are heated within the calcination chamber so as to release carbon dioxide; and
  restricting the carbon dioxide from leaving the calcination chamber via the at least one gravity driven moving particle bed; and
  adjusting a height of the at least one gravity driven moving particle bed via a flow restriction device based at least in part on a pressure gradient across the at least one gravity driven moving particle bed.

2. The method of claim 1, wherein the method further comprises:
  receiving the plurality of heat-transferring particles at an entrance of the calcination chamber, the sealing-purger disposed upstream of the entrance so as to fluidly connect the calcination chamber to a device that has a lower pressure than the calcination chamber; and
  forming the at least one gravity driven moving particle bed out of the plurality of heat-transferring particles.

3. The method of claim 1, wherein the method further comprises:
  receiving the plurality of sorbent particles at an entrance of the calcination chamber, the sealing-purger disposed upstream of the entrance so as to fluidly connect the calcination chamber to a device that has a lower pressure than the calcination chamber; and
  forming the at least one gravity driven moving particle bed out of the plurality of sorbent particles.

4. The method of claim 1, wherein the method further comprises:
  allowing the plurality of heat-transferring particles and the plurality of sorbent particles to leave the calcination chamber via an exit, the sealing-purger disposed downstream of the exit so as to fluidly connect the calcination chamber to a device that has a lower pressure than the calcination chamber; and
  forming the at least one gravity driven moving particle bed out of the plurality of sorbent particles and the plurality heat-transferring particles.

5. The method of claim 4, wherein a first gravity driven moving particle bed of the sealing-purger is disposed upstream of a second gravity driven moving particle bed of the sealing-purger.

6. The method of claim 5, wherein the method further comprises:
  introducing a purge gas at an intermediate location between the first and the second gravity driven moving particle beds.

7. The method of claim 6, wherein the purge gas is pressurized air.

* * * * *